(12) United States Patent
Skunberg et al.

(10) Patent No.: US 7,873,967 B2
(45) Date of Patent: Jan. 18, 2011

(54) PLUGGABLE BUSINESS LOGIC

(75) Inventors: Mark Skunberg, Moorhead, MN (US); William F. Pfingsten, Davenport, ND (US); Michael V. Lee, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1362 days.

(21) Appl. No.: 11/363,132

(22) Filed: Feb. 27, 2006

(65) Prior Publication Data

US 2007/0233500 A1 Oct. 4, 2007

(51) Int. Cl.
G06F 13/00 (2006.01)
(52) U.S. Cl. .................. 719/331; 719/318; 719/332
(58) Field of Classification Search .......... 719/318, 719/331, 332
See application file for complete search history.

(56) References Cited

U.S. PATENT DOCUMENTS

| | | | |
|---|---|---|---|
| 5,790,789 | A | 8/1998 | Suarez |
| 5,845,289 | A | 12/1998 | Baumeister et al. |
| 6,336,211 | B1 | 1/2002 | Soe |
| 6,430,705 | B1 | 8/2002 | Wisor et al. |
| 6,442,620 | B1 | 8/2002 | Thatte et al. |
| 6,484,276 | B1 | 11/2002 | Singh et al. |
| 6,668,370 | B1 | 12/2003 | Harmon et al. |
| 6,745,388 | B1 | 6/2004 | Gupta et al. |
| 6,779,184 | B1 | 8/2004 | Puri et al. |
| 6,789,252 | B1 | 9/2004 | Burke et al. |
| 6,850,922 | B1 | 2/2005 | Wason |
| 6,901,595 | B2 | 5/2005 | Mukundan et al. |
| 7,072,934 | B2 | 7/2006 | Helgeson et al. |
| 7,197,512 | B2 | 3/2007 | Pharies et al. |
| 2001/0047385 | A1 | 11/2001 | Tuatini |
| 2002/0023261 | A1 | 2/2002 | Goodwin et al. |
| 2002/0165903 | A1 | 11/2002 | Zargham et al. |
| 2002/0170036 | A1 | 11/2002 | Cobb et al. |
| 2002/0188869 | A1 | 12/2002 | Patrick |
| 2003/0055668 | A1 | 3/2003 | Saran et al. |
| 2003/0101251 | A1 | 5/2003 | Low |
| 2003/0135384 | A1 | 7/2003 | Nguyen |
| 2003/0167229 | A1 | 9/2003 | Ludwig et al. |
| 2003/0182452 | A1 | 9/2003 | Upton |
| 2003/0233477 | A1 | 12/2003 | Ballinger et al. |

(Continued)

FOREIGN PATENT DOCUMENTS

EP 1376337 1/2004

(Continued)

OTHER PUBLICATIONS

"Migrating from ASP.NET 1.X to ASP.NET 2.0," Microsoft Corporation.

(Continued)

Primary Examiner—Andy Ho
(74) Attorney, Agent, or Firm—Marshall, Gerstein & Borun LLP

(57) ABSTRACT

Business logic may be separated into pieces and each piece may be pluggable (i.e. replaceable). An event model is created to allow subscribers to listen to business events, the business logic is implemented into a series of strategies that are subscribers to the business events and the business strategies are late bound so they can be replaced. Each strategy is written with granular protected behaviors.

20 Claims, 2 Drawing Sheets

U.S. PATENT DOCUMENTS

Figure 1:
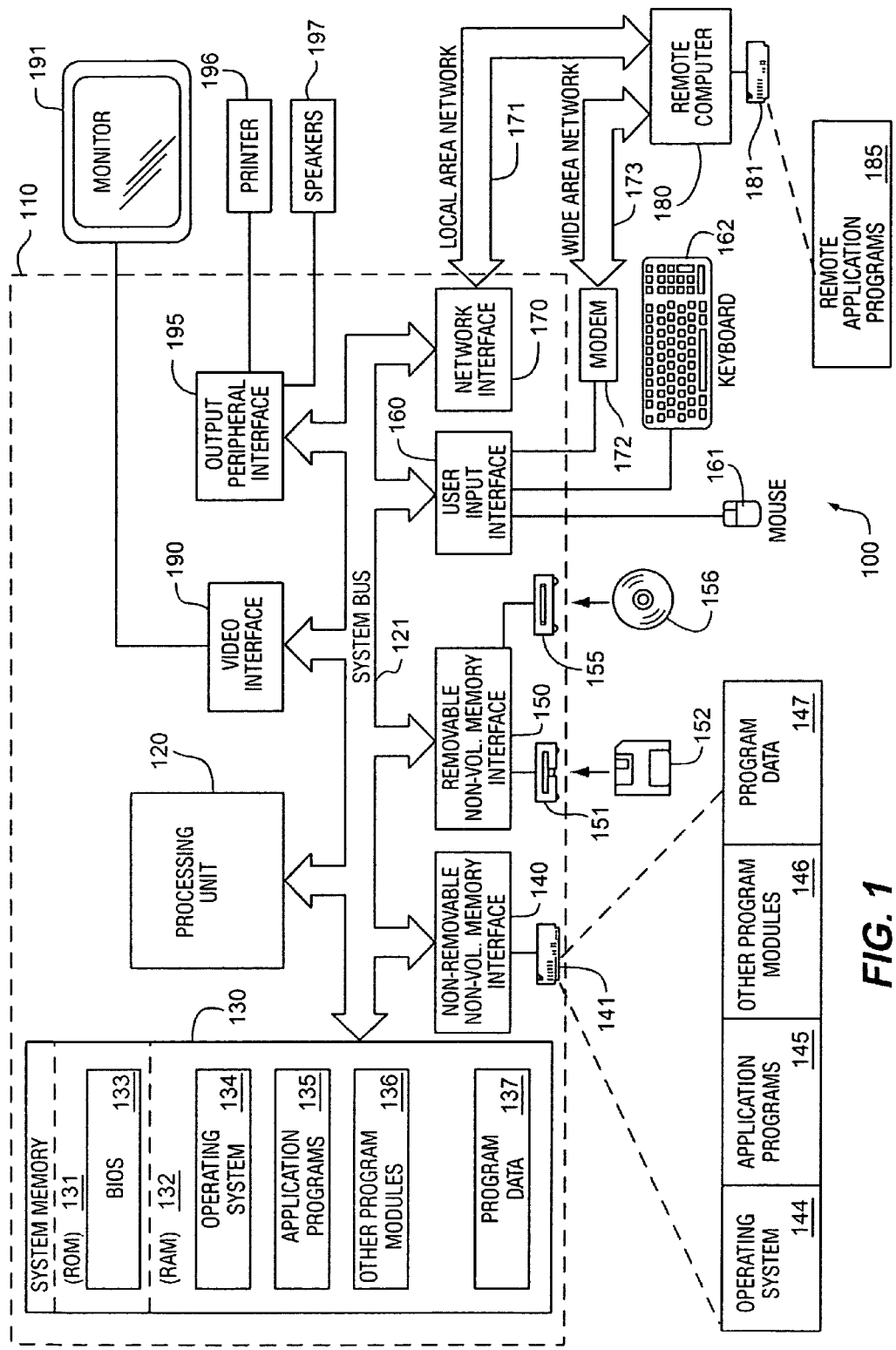

| | | |
|---|---|---|
| 2004/0068728 A1 | 4/2004 | Blevins |
| 2004/0093581 A1 | 5/2004 | Nielsen et al. |
| 2004/0186764 A1 | 9/2004 | McNeill |
| 2004/0194069 A1 | 9/2004 | Surasinghe |
| 2005/0015619 A1 | 1/2005 | Lee |
| 2005/0132276 A1 | 6/2005 | Panditharadhya et al. |
| 2005/0138013 A1 | 6/2005 | Walker et al. |
| 2005/0166187 A1 | 7/2005 | Das et al. |
| 2005/0203956 A1 | 9/2005 | Dweck et al. |
| 2005/0267765 A1 | 12/2005 | Jeng et al. |
| 2006/0064425 A1 | 3/2006 | Kakivaya et al. |
| 2006/0101445 A1 | 5/2006 | Carbajales et al. |

FOREIGN PATENT DOCUMENTS

| | | |
|---|---|---|
| EP | 1594049 | 11/2005 |
| WO | WO-0057339 | 9/2000 |
| WO | WO-2005069125 | 7/2005 |

OTHER PUBLICATIONS

"Migrating from In-house Proprietary FIX Engine to CameronFIX," Cameron Systems.

"Using WebLogic's Distributed Server-side Beans," BEA Systems, Inc. 2000.

"SourceForge.net: Fasttrack," OSTG Open Source Technology Group, 2005.

Gamma et al., "Design Patterns: Elements of Reusable Object-Oriented Software," Addison Wesley Longman, Inc. 1995, pp. 315-323.

Harold Davis, (Harold Davis.pdf), Create Custom class interfaces in .NET, Jan. 16, 2003.

O'Reily, (O'Reilly.pdf), Constraints, Nov. 23, 2005.

Jonathan Laurie, (Jonathan.pdf), Sort Arrays easily and efficiently in .NET, May 22, 2003.

Fred Swartz, (Fred Swartz.pdf) Equality Comparison, Dec. 18, 2005.

Bracha, G., "Generics in the Java Programming Language," Jul. 5, 2005.

"Introduction to Generics (C# Programming Guide)."

"Generics," Sun Microsystems, Inc. 2004.

Williams, et al., "Enabling Adaptive Enterprise Services Oriented Architectures with Distributed Object-Oriented Middleware."

Karastoyanova et al., "Extending Web Service Flow Models to Provide for Adaptability."

Piccinelli et al., "Service-oriented Modelling for e-Business Applications Components," IEEE 2001.

Kreger, "Web Services Conceptual Architecture," IBM Corporation May 2001.

Dare Obasanjo, XML Serialization in the .NET Framework, Jan. 23, 2003, Microsoft Corp. (Dare Obasanjo.pdf).

Evangelos Petroutsos, Store and Retrieve XML-based Business Object with SQL server and .NET, Aug. 20, 2003, Jupitermedia Corp. (Evangelos Petroutsos.pdf).

Dare Obasanjo, Designing Extensible, Versionable XML Formats.

PLUGGABLE BUSINESS LOGIC

BACKGROUND

Business logic between different countries, cultures and industries is different. In order make our products' business logic fit into these different segments, the business logic has to be customized. Currently, this problem is generally solved with one of two approaches. First, one set of source code is created that contains all the variations. This approach results in overly complex business logic with unnecessary "if then" logic. Because the same code base is always being changed, a limited number of people can change the code and exhaustive regression testing has to be performed. Second, multiple sets of source code are created that contain the business logic for each variation. This approach results in duplicate effort to bring one feature to all segments because the same new feature code has to be applied to each source code copy.

SUMMARY

Business logic may be separated into pieces and each piece may be pluggable (i.e. replaceable). An event model is created to allow subscribers to listen to business events. The business logic is implemented into a series of strategies that are subscribers to the business events. The business strategies are late bound so they can be replaced. Each strategy is written with granular protected behaviors. This approach follows the open closed principle, maximizing developer efficiency and limiting regression testing because once it is built it no longer has to be modified.

DRAWINGS

Figure 2:
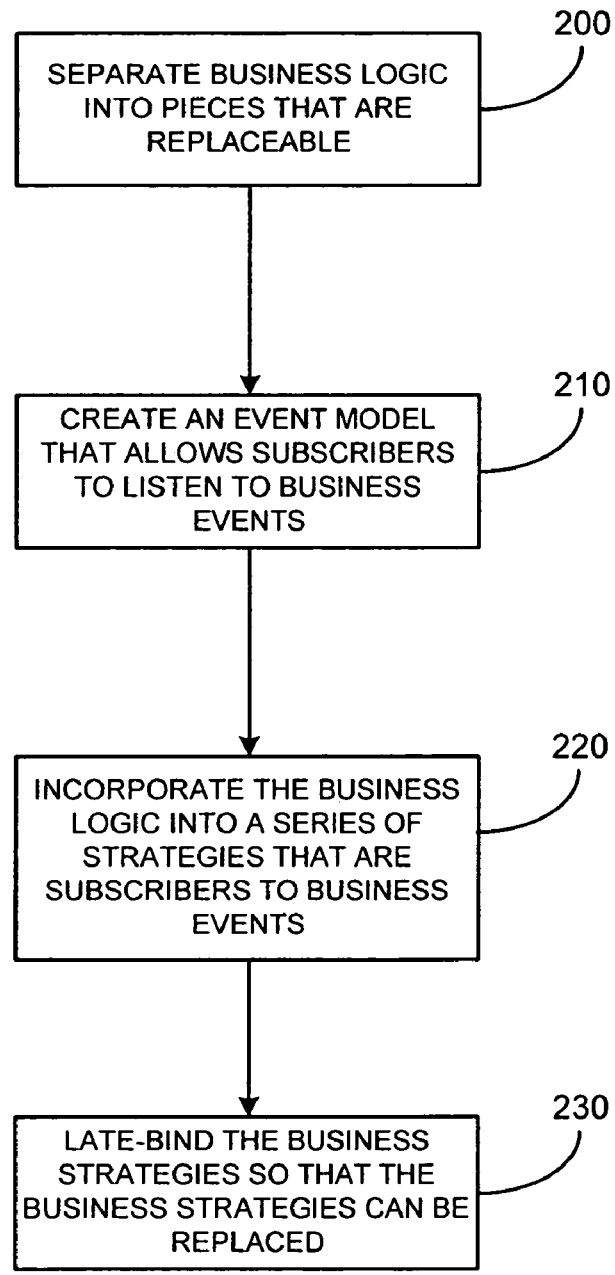

FIG. 1 is a block diagram of a computing system that may operate in accordance with the claims; and FIG. 2 is a flowchart of a method in accordance with the claims.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIG. 2 may be an illustration of a method of creating pluggable business logic for a business application. Previous approaches to creating updates to business software have been inefficient. One solution may be to break up the business logic into more pieces and allow for each piece to be pluggable (i.e. replaceable). This may be accomplished with several concepts. First, an event model may be created to allow subscribers to listen to business events. Second, the business logic may be put into a series of strategies that are subscribers to the business events. Third, the business strategies may be late bound so they can be replaced. Fourth, each strategy may be written with granular protected behaviors. This approach follows the open closed principle which may maximize developer efficiency and limit regression testing because once it is built it no longer has to be modified.

At block 200, the method may separate business logic into pieces that are replaceable. In this approach, the business logic may be reviewed and pieces that are central to any system may be kept as a logical piece. Related, pieces that may change may be broken off and stored as replaceable pieces. For example, a business application typically accept monetary amounts in one currency and may accept monetary amounts in more than one currency. The multi-currency business logic may be broken out and saved as replaceable pieces.

At block 210, the method may create an event model that allows subscribers to listen to business events. The model may be installed on a customer's system and the model may be configured to listen for announcements from a business event. At this point, the customer system may react to the business event. Sample computer executable code to implement the method may be as follows:

The Instance Based Business Event Business Strategy Subscriber

```
/// <summary>
/// This class contains methods that perform <c>GLAccount</c>
defaulting.
/// </summary>
public class GLAccountDefaultStrategyImplementation
{
    #region fields
    private GLAccount account;
    private BusinessObjectEventArgs eventArgs;
    #endregion
    #region constructor
    /// <summary>
    /// Default constructor
    /// </summary>
    public GLAccountDefaultStrategyImplementation( ) { }
    #endregion
    #region methods
    /// <summary>
    /// Defaults a <c>GLAccount</c> when an instance is being added to
    the data store.
    /// </summary>
    /// <param name="sender">Used to identify who raised the
    event.</param>
    /// <param name="e">Used to default the
    <c>GLAccount</c>.</param>
    public void DefaultingForCreate(object sender,
    BusinessObjectEventArgs e)
    {
        account = (GLAccount)e.BusinessObject;
        eventArgs = e;
        Behavior1( );
        Behavior2( );
    }
    #region protected methods
    protected void Behavior1( )
    {
            IMPLEMENATION DETAILS GO HERE
    }
    protected void Behavior2( )
    {
            IMPLEMENATION DETAILS GO HERE
    }
    #endregion
    #endregion
}
```

At block 220, the method may incorporate the business logic into a series of strategies that are subscribers to business events. Strategies may be thought of as pieces of computer executable instruction. The strategies may listen for announcements from a business event that the event is occurring or has occurred. Going back to the multi-currency example, the period end close event may need to determine and post multi-currency gains and losses. Multi-currency installations may be configured so when the period end event is raised, a strategy is executed to determine and post multi-currency gains and losses. Sample code to implement the event subscriber may be as follows:

The Business Event Business Strategy Subscriber

```
/// <summary>
/// This static class contains static methods that are event handlers
    for <c>GLAccount</c>
variations defaulting.
/// </summary>
public static class GLAccountDefaultStrategy
```

-continued

```
{
    #region methods
    /// <summary>
    /// Defaults a <c>GLAccount</c> when an instance is being
    added to the data store.
    /// </summary>
    /// <param name="sender">Used to identify who raised the
    event.</param>
    /// <param name="e">Used to default the
    <c>GLAccount</c>.</param>
    public static void DefaultingForCreate(object sender,
    BusinessObjectEventArgs e)
    {
        GLAccountDefaultStrategyImplementation
            defaultStrategy = new
GLAccountDefaultStrategyImplementation( );
            defaultStrategy.DefaultingForCreate(sender, e);
    }
    #endregion
}
```

In addition, each strategy may be written with granular protected behaviors. In this way, business logic can be finely adjusted by overriding a few protected behaviors and executing the new strategy. For example, German law allows negative debits and credits. German installations may be configured to permit a strategy to execute that allows negative debits and credits by overriding one validation behavior.

The method may also allow a specific product installation to select what business strategies are used for that particular installation. For example, in the multi-currency example, many installations do not accept monetary amounts in more than one currency. Therefore, the multi-currency strategies can be turned off so they do not execute. As a result, the method may not waste time, processing power and bandwidth.

Related, the method may create a hierarchy of business strategies. The hierarchy of business strategies may be determined in view of the common business rules between target users. In this way, changes that affect multiple countries, cultures, industries and businesses may be made at a high level of the hierarchy and changes that affect a few businesses may be made at a low level of the hierarchy.

Each business strategy may be a static class with a static invocation method for a business event. As a result, the relationship between the vendor and the software subscriber may be cached because the invocation is static and will not change.

The business event business strategy subscriber may include a static business strategy class, a static innovation method for a business event and a delegation to one instance based business strategy subscriber. The instance based business strategy subscriber may include fields holding state and protected behaviors that may be re-implemented by another business strategy variation.

If an individual business strategy needs to hold state while it is executing against a business object, the method may delegate its implementation to a corresponding business strategy instance implementation. The method may use business event configuration meta-data to bind business event publishers to business event subscribers. The metadata may describe the business object, the business object events, and the business object event handlers to each event describing the event handler assembly, the event handler type, a static delegate invocation method and an execution flag. The metadata may contain additional data. The following may be an example of code implemented to execute the method:
The Business Event Configuration Meta-Data

```xml
<?xml version="1.0" encoding="utf-8"?>
<BusinessObjectsFile>
<xmlSerializerSection type="Microsoft.Business.Common.Settings, Microsoft.Business.Common, Version=1.0.0.0,
Culture=neutral, PublicKeyToken=null">
<Settings xmlns:xsd="http://www.w3.org/2001/XMLSchema" xmlns:xsi="http://www.w3.org/2001/XMLSchema-instance">
    <BusinessObjects>
        <DictionaryEntry>
            <Key xsi:type="xsd:string">Microsoft.GreatPlains.GLPostingAccount</Key>
            <Value xsi:type="BusinessObjectConfiguration">
                <Event>
                    <EventName>DefaultingForCreate</EventName>
                    <EventHandlerType>
        <Type>Microsoft.Business.Common.BusinessObjectEventHandler</Type>
                        <Assembly>Microsoft.Business.Common</Assembly>
                    </EventHandlerType>
                    <EventHandler>
                        <SoftwareVendor>Microsoft</SoftwareVendor>
                        <Type>Microsoft.GreatPlains.GLAccountDefaultStrategy</Type>
                        <StaticMethod>DefaultingForCreate</StaticMethod>
                        <Assembly>Microsoft.GreatPlains.BusinessLogic</Assembly>
                        <Execute>true</Execute>
                    </EventHandler>
                    <EventHandler>
                        <SoftwareVendor>Microsoft</SoftwareVendor>
                        <Type>Microsoft.GreatPlains.GLFinancialAccountDefaultStrategy</Type>
                        <StaticMethod>DefaultingForCreate</StaticMethod>
                        <Assembly>Microsoft.GreatPlains.BusinessLogic</Assembly>
                        <Execute>true</Execute>
                    </EventHandler>
                    <EventHandler>
                        <SoftwareVendor>Microsoft</SoftwareVendor>
                        <Type>Microsoft.GreatPlains.GLPostingAccountDefaultStrategy</Type>
                        <StaticMethod>DefaultingForCreate</StaticMethod>
                        <Assembly>Microsoft.GreatPlains.BusinessLogic</Assembly>
                        <Execute>true</Execute>
                    </EventHandler>
                </Event>
            </Value>
        </DictionaryEntry>
    </BusinessObjects>
</Settings>
</xmlSerializerSection>
</BusinessObjectsFile>
```

At block 230, the method may late-bind the business strategies so that the business strategies can be replaced. The executable program may be broken into pieces such as multiple .dll files. The actual binding of the various files into one executable program may take place at runtime, thereby allowing the updated business strategies to be seamlessly integrated into the final executable.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer system comprising:
    a processor capable of executing computer executable instructions;
    a memory capable of storing computer executable instructions; and
    an input/output circuit
        where the processor is programmed to execute computer executable instructions for creating pluggable business logic, the instructions comprising code for:
    separating business logic into pieces that are replaceable;
    creating an event model that allows subscribers to listen to business events;
    putting the business logic into a series of strategies that are subscribers to business events; and
    late-binding the business strategies so that the business strategies can be replaced.

2. The computer system of claim 1, further comprising computer instructions for writing each strategy with granular protected behaviors.

3. The computer system of claim 1, further comprising computer instructions for creating a hierarchy of business strategies.

4. The computer system of claim 1, further comprising computer instructions for determining the hierarchy of business strategies in view of the common business rules between target users.

5. The computer system of claim 1, wherein the each business strategy is a static class with a static invocation method for a business event.

6. The computer system of claim 1, wherein no relationship between a publisher and a subscriber is cached.

7. The method computer system of claim 1, further comprising computer instructions for if an individual business strategy needs to hold state while it is executing against a business object, delegating its implementation to a corresponding business strategy instance implementation.

8. The computer system of claim 1, further comprising computer instructions for allowing a specific product installation to select what business strategies are used for that particular segment.

9. The computer system of claim 1, further comprising computer instructions for using business event configuration meta-data to bind business event publishers to business event subscribers.

10. The computer system of claim 9, wherein the metadata describes the business object, the business object events, and the business object event handlers to each event describing the event handler assembly, the event handler type, a static delegate invocation method and an execution flag.

11. The computer system of claim 10, wherein the business event business strategy subscriber comprises at least one of:
   a static business strategy class;
   a static innovation method for a business event; and
   a delegation to one or more instance based business strategy subscribers.

12. The computer system of claim 11, wherein the instance based business strategy subscriber comprises:
   fields holding state; and
   protected behaviors that may be re-implemented by another business strategy variation.

13. A nontransitory computer storage medium for storing computer executable code, the computer executable code creating pluggable business logic comprising code for:
   separating business logic into pieces that are replaceable;
   creating an event model that allows subscribers to listen to business events;
   putting the business logic into a series of strategies that are subscribers to business events;
   creating a hierarchy of business strategies;
   determining the hierarchy of business strategies in view of the common business rules between target users; and
   late-binding the business strategies so that the business strategies can be replaced.

14. The computer readable medium of claim 13, wherein the each business strategy is a static class with a static invocation method for a business event.

15. The computer readable medium of claim 13, further comprising code that if an individual business strategy needs to hold state while it is executing against a business object, delegating its implementation to a corresponding business strategy instance implementation.

16. The computer readable medium of claim 13, further comprising allowing a specific product installation to select what business strategies are used for that particular segment.

17. The computer readable medium of claim 13, further comprising using business event configuration meta-data to bind business event publishers to business event subscribers; and wherein the metadata describes the business object, the business object events, and the business object event handlers to each event describing the event handler assembly, the event handler type and a static delegate invocation method.

18. The computer readable medium of claim 13, wherein the business event business strategy subscriber comprises at least one of:
   a static business strategy class;
   a static innovation method for a business event; and
   a delegation to one or more instance based business strategy subscribers.

19. A computer system comprising:
   a processor capable of executing computer executable code;
   a memory capable of storing computer executable code; and
   an input/output circuit
      where the processor is programmed to execute computer executable code for creating pluggable business logic, the code comprising code for:
         separating business logic into pieces that are replaceable;
         creating an event model that allows subscribers to listen to business events;
         putting the business logic into a series of strategies that are subscribers to business events and wherein the each business strategy is a static class with a static invocation method for a business event;
         creating a hierarchy of business strategies;
         determining the hierarchy of business strategies in view of the common business rules between target users; and
         late-binding the business strategies so that the business strategies can be replaced.

20. The computer system of claim 19, further comprising code for using business event configuration meta-data to bind business event publishers to business event subscribers; and wherein the metadata describes the business object, the business object events, and the business object event handlers to each event describing the event handler assembly, the event handler type and a static delegate invocation method.

* * * * *